Figure 1:
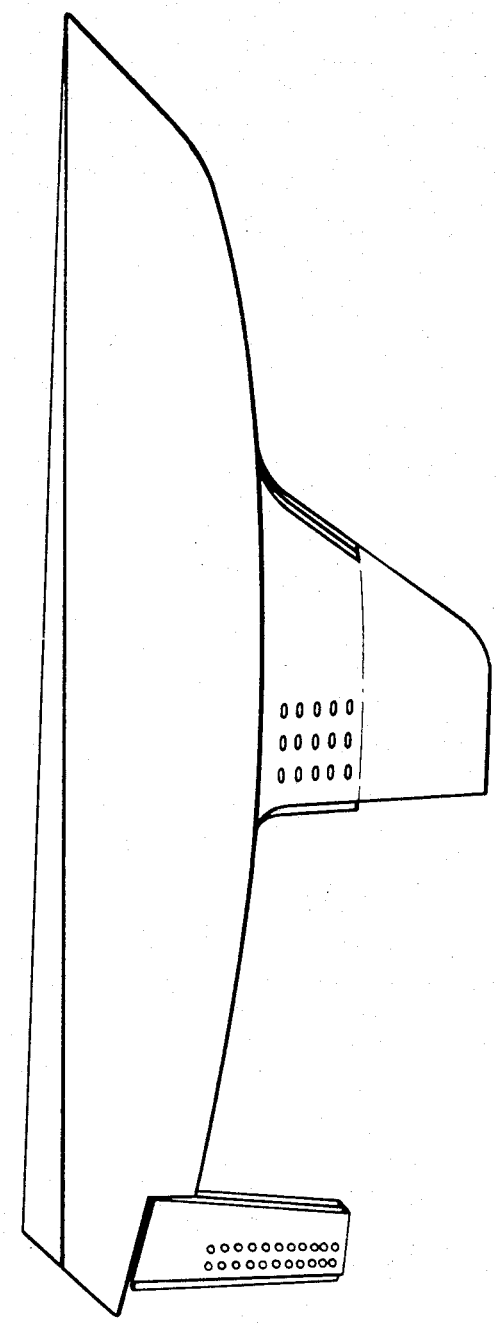

United States Patent [19]

Åkerblom

[11] Patent Number: 4,515,101

[45] Date of Patent: May 7, 1985

[54] FLOW-MODIFYING ELEMENT, ESPECIALLY A RUDDER

[76] Inventor: Bengt Åkerblom, Tokers väg 1, S-231 00 Trelleborg, Sweden

[21] Appl. No.: 474,647

[22] PCT Filed: Jun. 29, 1982

[86] PCT No.: PCT/SE82/00230

§ 371 Date: Feb. 25, 1983

§ 102(e) Date: Feb. 25, 1983

[87] PCT Pub. No.: WO83/00129

PCT Pub. Date: Jan. 20, 1983

[30] Foreign Application Priority Data

Jun. 30, 1981 [SE] Sweden .............................. 8104074

[51] Int. Cl.³ .......................................... B63H 25/38
[52] U.S. Cl. ................................... 114/162; 114/140; 244/209
[58] Field of Search ............. 244/207, 208, 209, 90 B, 244/87; 114/162, 127–143, 278, 288, 289; 440/67

[56] References Cited

U.S. PATENT DOCUMENTS

| | | | |
|---|---|---|---|
| 2,484,359 | 10/1949 | Tipton | 244/87 |
| 2,873,931 | 2/1959 | Fleischmann | 244/207 |
| 2,961,987 | 11/1960 | Mello | 114/162 |
| 3,128,063 | 4/1964 | Kaplan | 244/207 |
| 3,184,185 | 5/1965 | Brocard | 244/207 |
| 3,604,661 | 9/1971 | Mayer | 244/207 |
| 3,680,511 | 8/1972 | English | 114/162 |

FOREIGN PATENT DOCUMENTS

| | | | |
|---|---|---|---|
| 1336152 | 7/1963 | France | 244/207 |
| 313497 | 3/1930 | United Kingdom | 244/208 |

Primary Examiner—Trygve M. Blix
Assistant Examiner—Rodney Corl
Attorney, Agent, or Firm—Beveridge, DeGrandi & Weilacher

[57] ABSTRACT

The object of this invention is an element, such as a rudder, and aircraft wing, a boat keel, a hydrofoil or an airfoil or the like, which is adapted to move through water or air and which is so designed that the water or the air is allowed to enter at the upstream edge of the element into and through a hollow space within said element and to leave said element at the trailing edge thereof, said hollow space within said element being divided into two halves by a central longitudinal partition (6) within said element, such that said element on either said of the said central partition (6) has a flow gap which, optionally, is divided into parallel passages by transverse partitions (4a, 4b, 5a–5c), the arrangement being such that the flow of water or air through and out of the gap between the central partition (6) and that side of the element which, in response to the angular deflection or profile, forms the suction side of said element, will be substantially larger than through the other gap.

5 Claims, 12 Drawing Figures

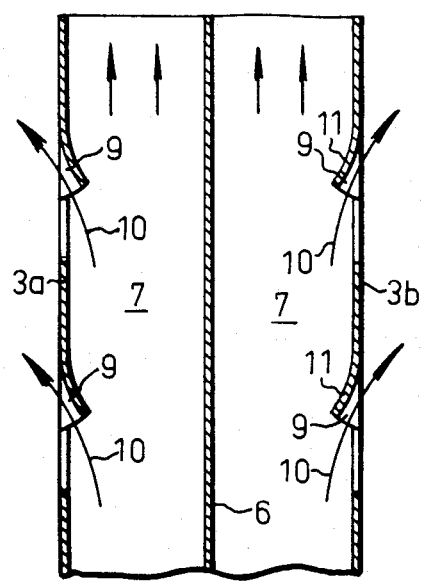
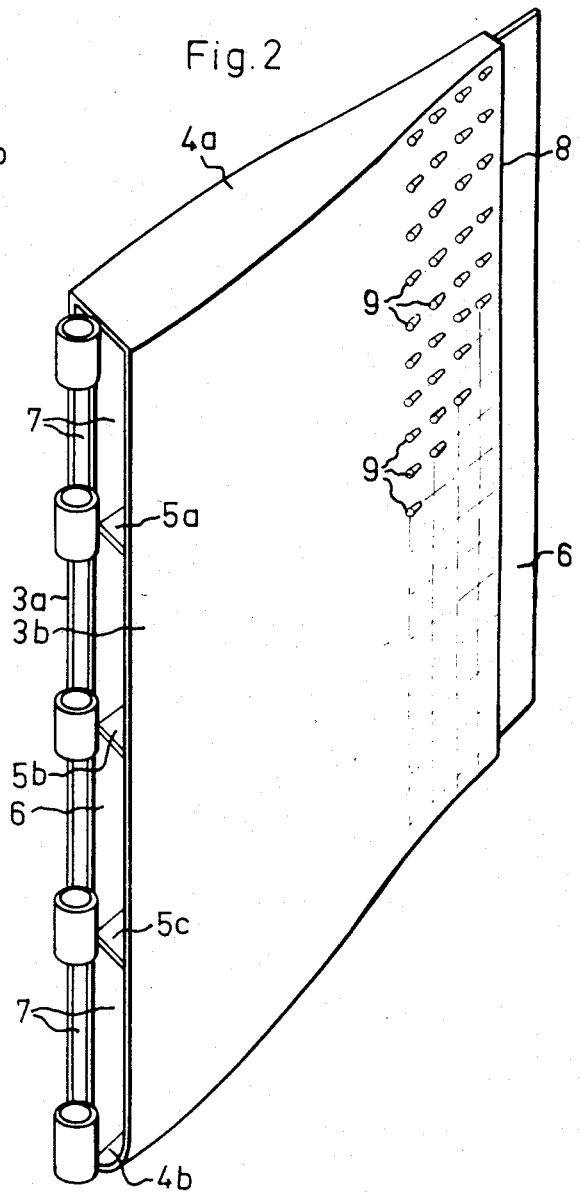

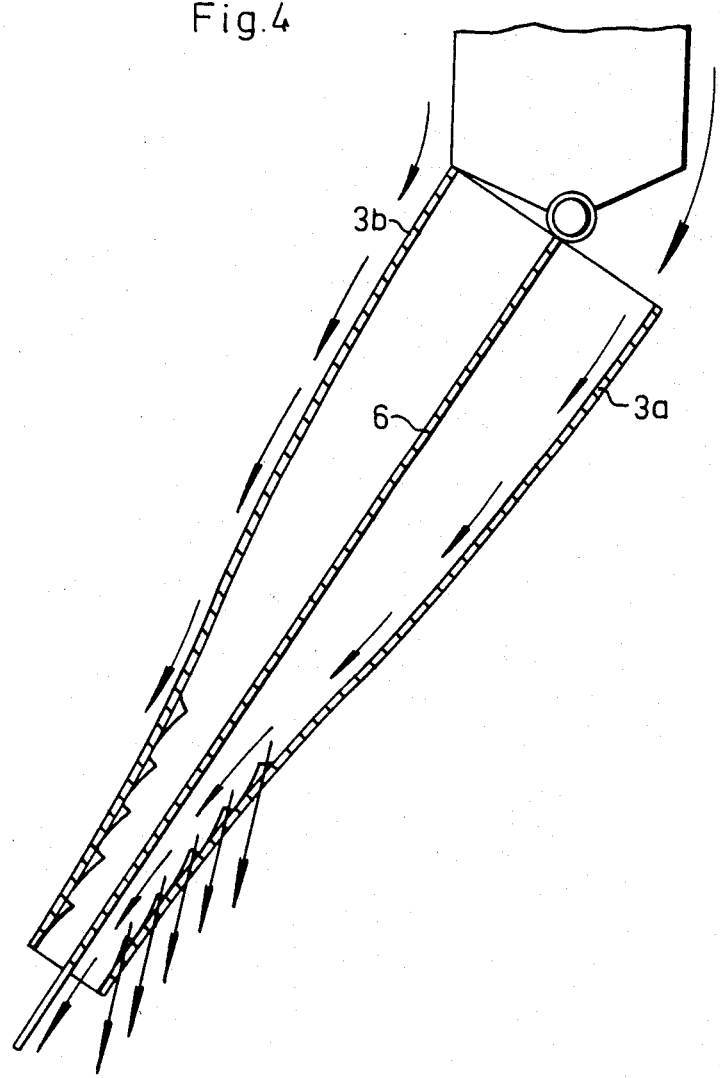

FLOW-MODIFYING ELEMENT, ESPECIALLY A RUDDER

The present invention relates to a rudder for boats and ships or, in other words, a rudder that can be used both for small vessels which are usually classed as "boats" and for larger vessels, and both for propeller-driven vessels and sailing vessels.

However, the rudder according to the invention also has other fields of application, for instance as a stabilizer, trim flap, keel and centerboard and, possibly, also fields of application outside the maritime sphere, for instance in aircraft, as a wind deflector, for example on large trucks, as well as other uses. Generally speaking, the invention thus is applicable to flow-modifying elements, but will be described in the following substantially with reference to ships' rudders.

It is an old-established notion to make a rudder hollow from its leading edge to its trailing edge, and this notion has been brought up again from time to time. U.S. Pat. No. 2,961,987 points out by way of introduction, and quite correctly, that the deflection of a rudder sets up hydrodynamic pressure on the pressure side of the rudder and a sub-normal pressure on the suction side of the rudder, whereby a strong eddy is produced in the vicinity of the rudder, producing a restraint on the ship's speed without having any useful effect on the desired rudder action. To reduce the flow resistance and to avoid eddies in order to reduce the propulsion resistance, this patent specification proposes a rudder having a series of flow passages which extend alternately from the opposite sides of the rudder from a vertical line near the leading edge of the rudder to the trailing edge thereof, the flow passages which extend at an angle relative to the rudder plane from one side of the rudder crossing the corresponding passages proceeding from the opposite side of the rudder without intersecting these passages because they lie in different vertical planes. The water is intended to flow into the passages proceeding from the pressure side of the rudder and to flow out on the suction side.

However, this prior art construction does not provide any favourable effect on drag and lift because the passages cross the rudder diagonally and, besides, set up a high flow resistance, for which reason they permit neither a sufficient throughflow quantity nor a sufficient flow velocity to achieve the objects stated in this patent specification.

A further disadvantage is that the known rudder upon zero rudder deflection contrary to a favourable effect causes considerable difficulties because the passage arrangement illustrated sets up a high water resistance and makes the rudder unstable.

Finally, it should be mentioned that the passages of the known rudder cause constructional differences increasing the costs.

The object of the present invention is to provide a rudder which has a favourable effect both on the pressure side and on the suction side and stabilizes the ship's way through the water from zero position of the rudder to maximum rudder deflections.

These objects have now been achieved in that the rudder according to the invention has been given the characteristic features stated in claim 1 and, for preferred embodiments, the characteristic features which are stated in claims 2–5.

Figure 5:
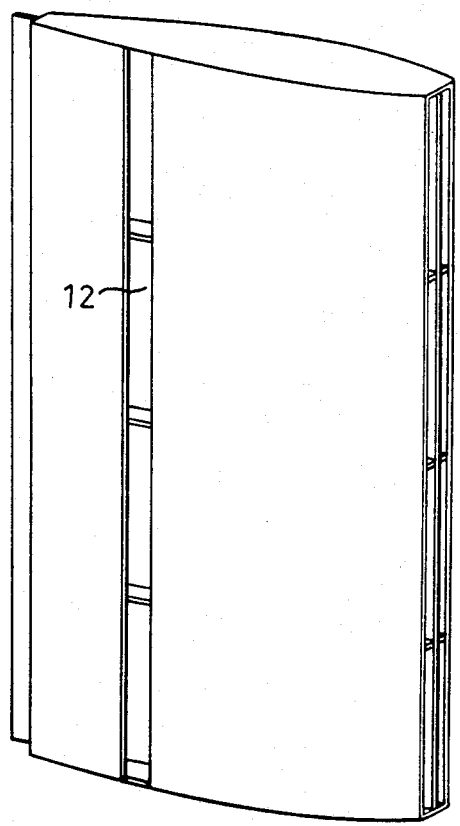
Figure 6:
Figure 7:
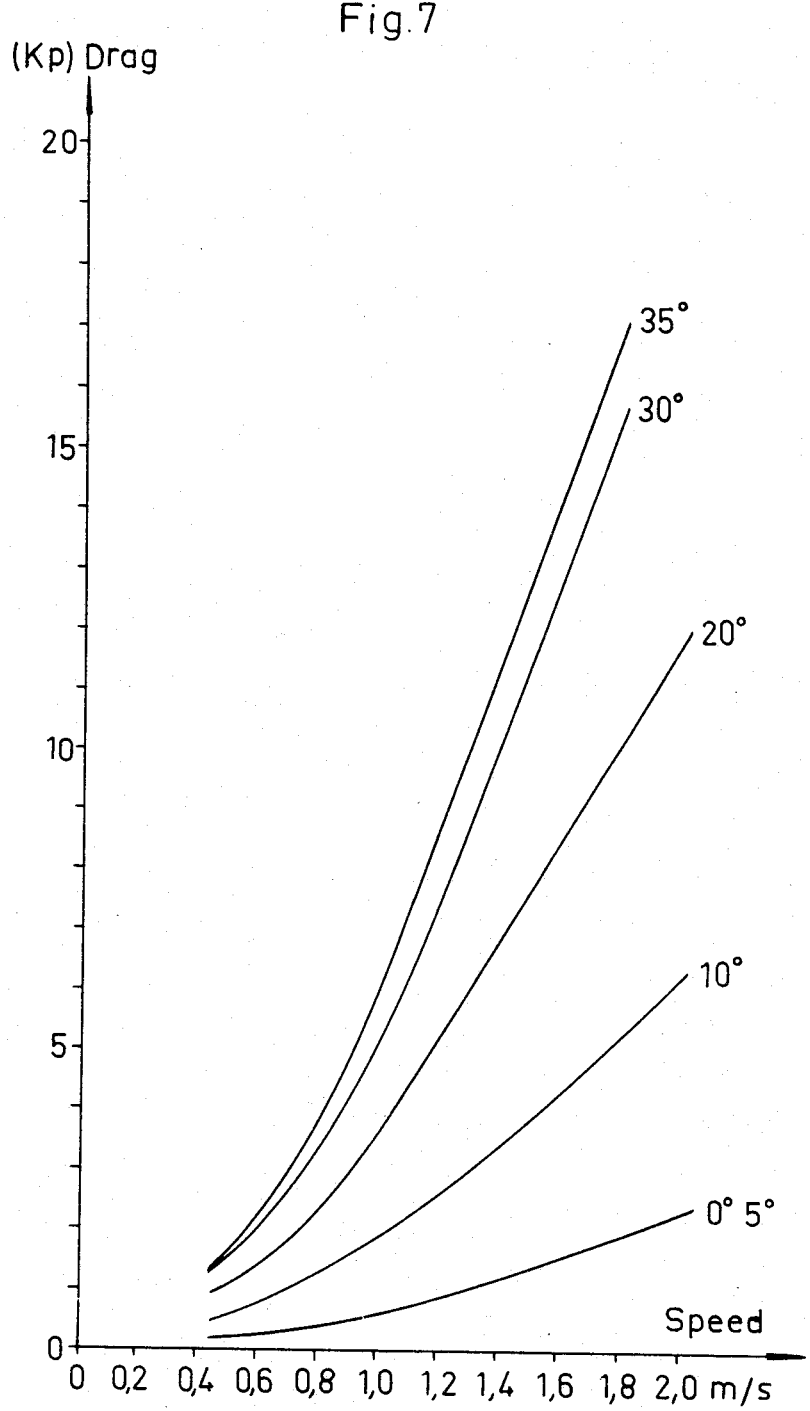
Figure 8:
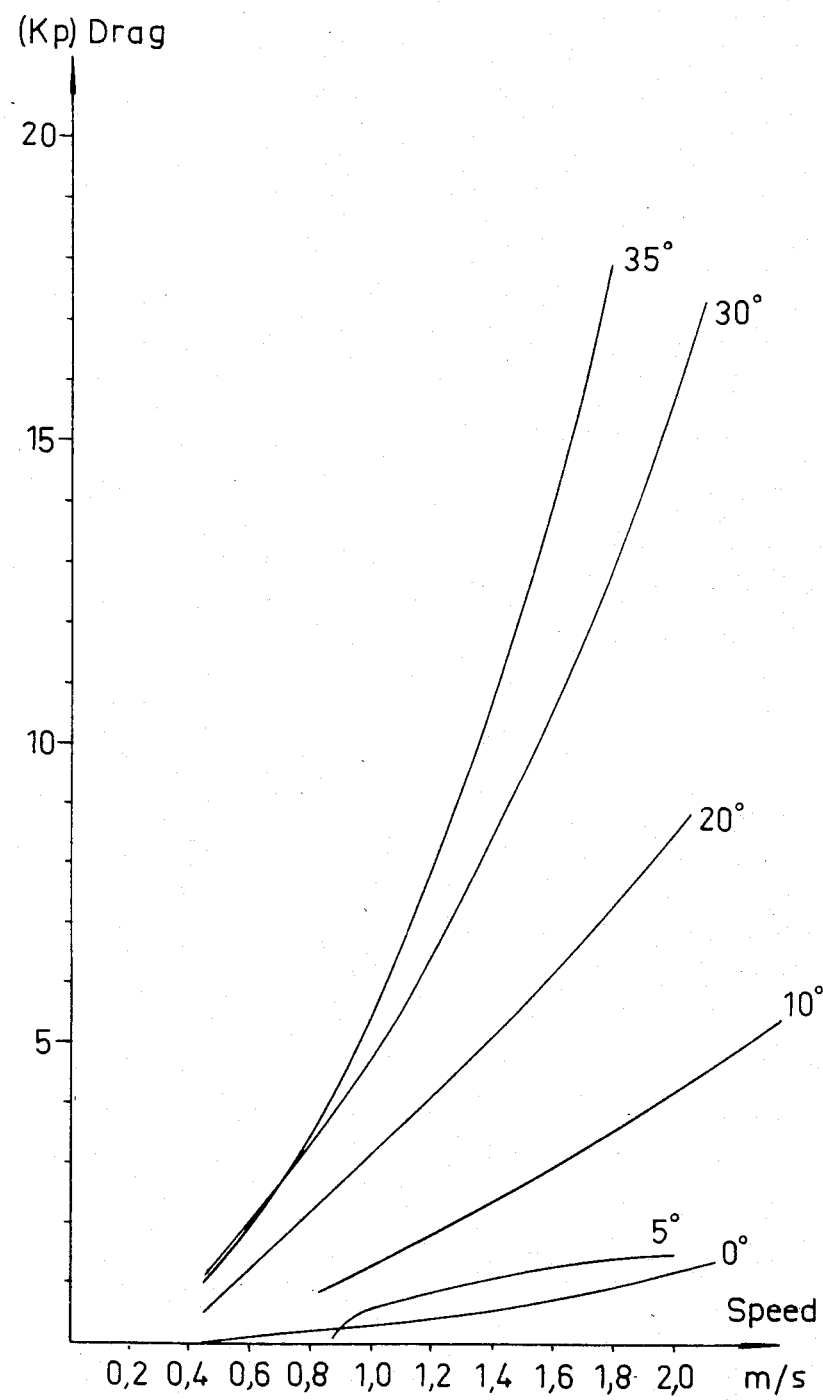
Figure 9:
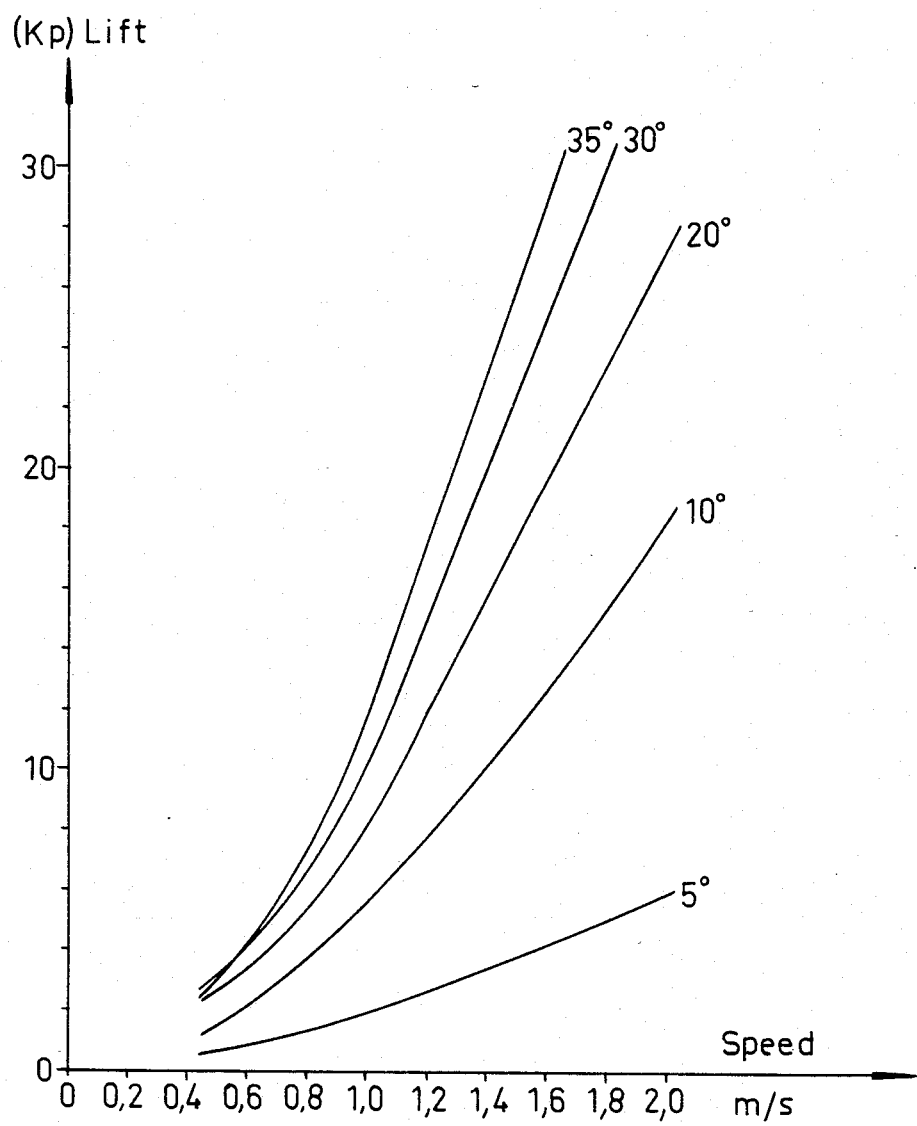
Figure 10:
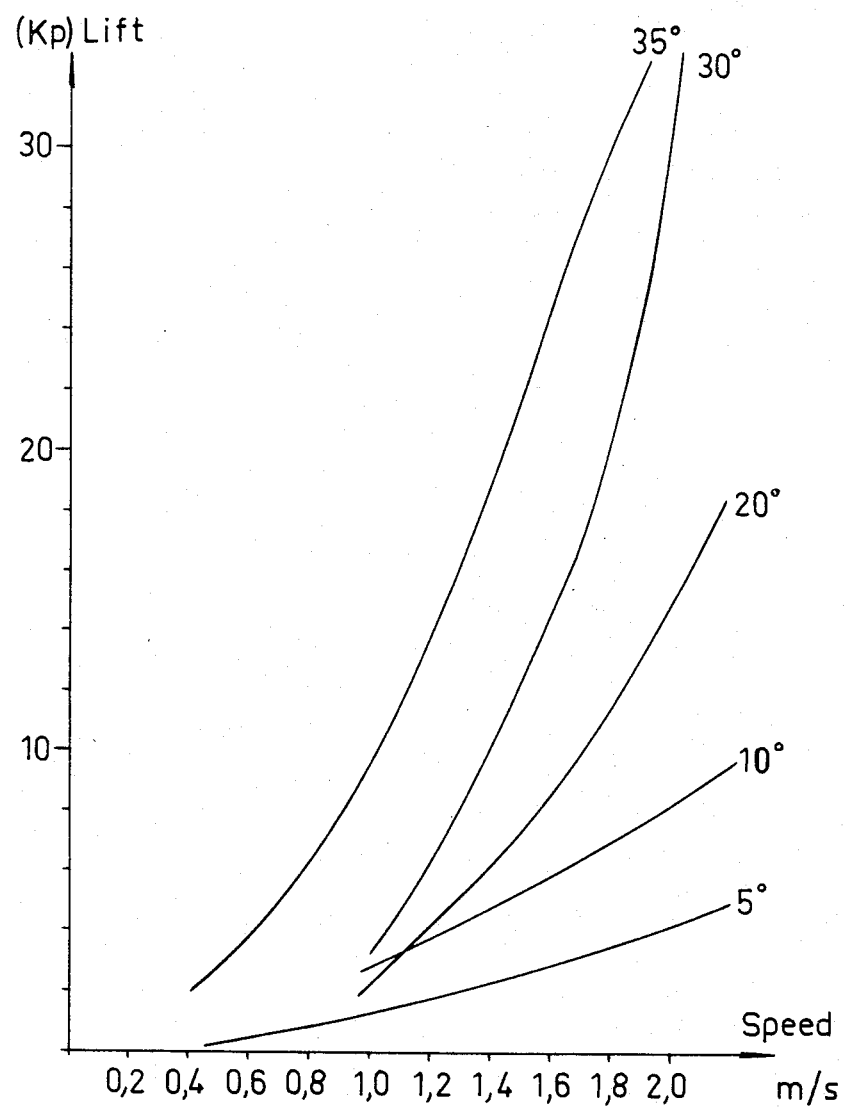
Figure 11:
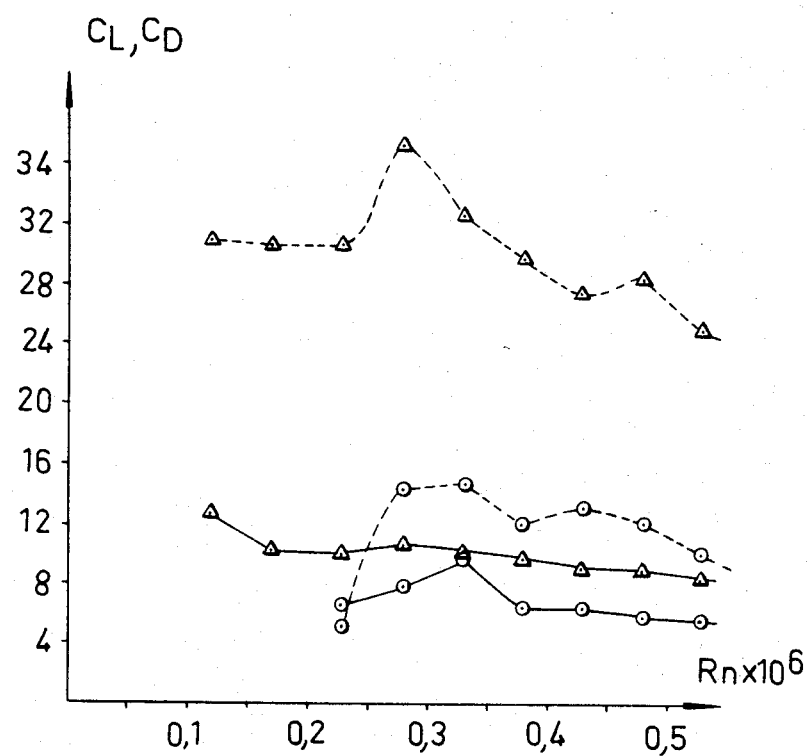
Figure 12:
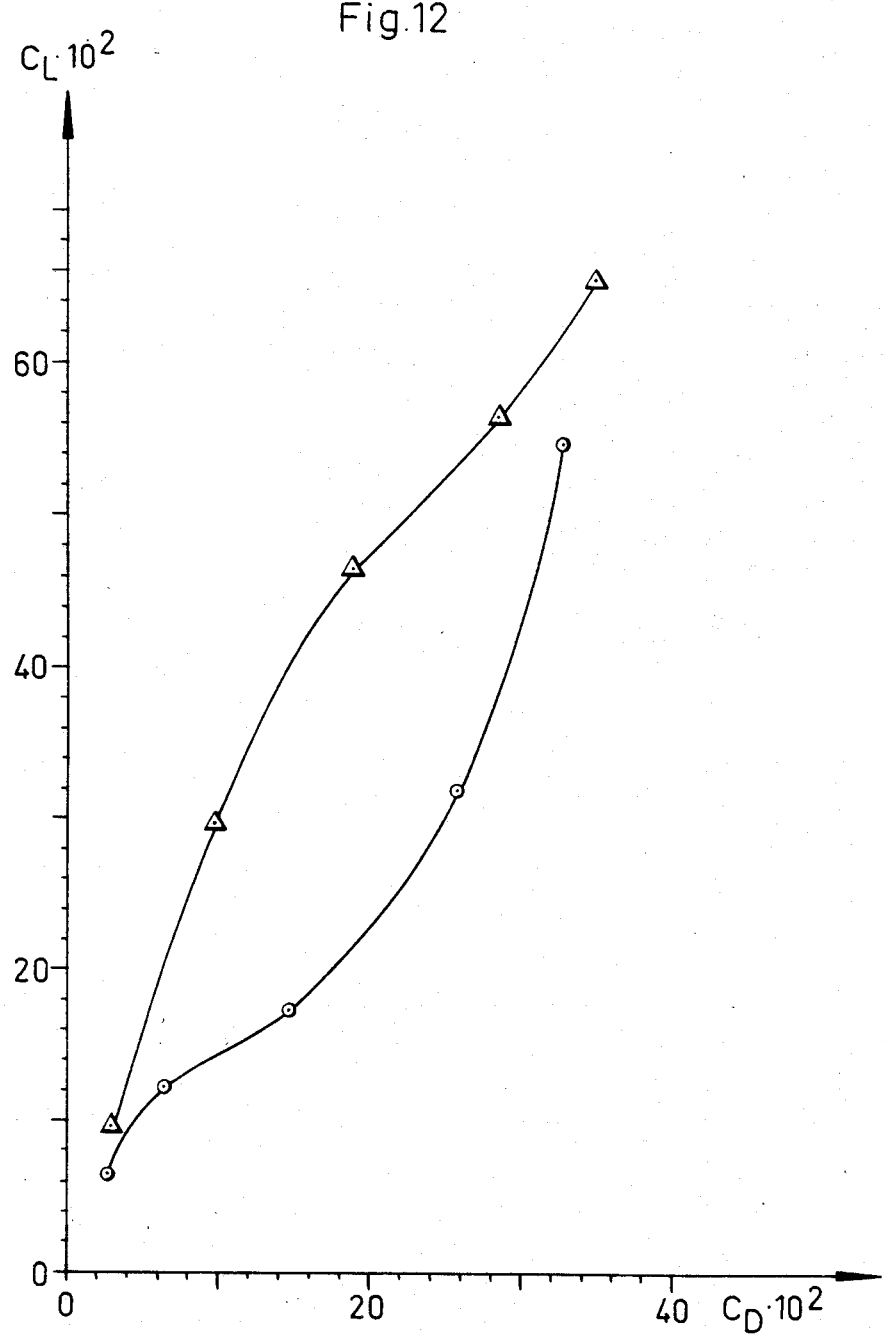

The invention will be described in more detail below, reference being had to the embodiments illustrated in the accompanying drawings in which FIG. 1 is a schematic view of a sailing-boat of the fin-keel type having a hollow rudder and a hollow fin-keel according to the invention, FIG. 2 is perspective and more detailed view of a hollow rudder according to the invention, FIG. 3 is a schematic section of a part of the rudder shown in FIG. 2, FIG. 4 is a perspective view of the rudder shown in FIG. 1, mounted behind a tail piece, FIG. 5 illustrates an alternative embodiment of a hollow rudder according to the invention, FIG. 6 is a diagram illustrating the concepts "drag" and "lift" applicable to all rudders, FIG. 7 illustrates, in the form of a diagram, the relations between drag and speed in a hollow rudder of the type which is shown in FIG. 6 and which has a NACA 0015 profile modified according to the invention, and FIG. 8 illustrates, in a similar diagram, an unmodified (conventional) NACA 0015 rudder, FIGS. 9 and 10 illustrate the relation between lift and speed in a modified NACA 0015 rudder according to the invention and an unmodified NACA 0015 rudder, respectively, FIG. 11 illustrates, in the form of a diagram, the effect of Reynolds' number on the lift and drag coefficients in an unmodified NACA 0015 rudder and a NACA 0015 rudder modified according to the invention, and FIG. 12 is a corresponding comparison diagram (non-dimensional) between the modified and the unmodified NACA 0015 rudder at a given speed through the water.

The rudder 1 and the fin-keel 2 as shown in FIG. 1 are designed in accordance with the invention and basically correspond to the hollow rudder according to the invention, as shown in FIG. 2.

The rudder shown in FIG. 2 has an outer shape which, at least in broad outline, corresponds to the outer shape of a conventional rudder. However, the rudder is hollow and comprises two outer side walls 3a, 3b which at the upper and lower rudder edges are interconnected by edge walls 4a, 4b. Furthermore, the two side walls are interconnected by means of a number of parallel transverse partitions 5a–5c. Extending between the upper and lower edge walls 4a, 4b, in the central plane of the rudder, is a continuous central wall 6 protruding at the trailing edge of the rudder.

As will appear from FIG. 2, the rudder is open at its leading edge, and the hollow space within the rudder is divided, by the partitions referred to above, into eight parallel passages 7 arranged in two juxtaposed rows, the outlets of said passages being provided at 8 at the trailing edges of the side walls 3a, 3b. The rudder shape causes the passages 7 to taper such that the outlets at the edge 8 are essentially narrower than the inlets at the leading edge of the rudder.

Within the region of the trailing part of the rudder, the side walls have a series of holes 9 arranged in vertical and horizontal rows. These holes may have the shape which is illustrated in FIG. 3 where the rudder walls 3a, 3b have been bent inwardly at the trailing edges of the holes. FIG. 3 indicates, by arrows 10, the flow direction through the passages 7 and the outflow through the holes at zero deflection of the rudder, i.e. the flow is symmetrical in both directions. Water entering at the leading edge of the rudder will, of course, also leave the rudder at the outlets at the trailing edge of the rudder.

FIG. 4 shows the rudder illustrated in FIG. 2 at a given rudder angle. The water flow (see the flow arrows) on the suction side has no adverse effect on the water flow on the pressure side, but affects the relative sub-normal pressure on the suction side at the trailing part of the rudder and, because of the outflow of the water through the holes and through the passage outlets at the trailing edge of the rudder between the central wall 6 and the side wall 3a on the suction side, causes a considerable reduction in turbulence.

It appears from FIG. 4 that the above-described shape of the holes, with inwardly bent walls 11 intercepting the water-flow, may to some extent increase the outflow of the water through the holes 9.

To simplify presentation, FIG. 2 shows the holes 9 only in the upper half the side wall 3b, but naturally also the lower half should be provided with similar holes. Furthermore, the number of the vertical rows of holes may be increased or decreased in order respectively to increase and decrease the apertured rudder area in response to the rudder construction, the rudder shape and the rudder size.

FIG. 5 illustrates an alternative embodiment in which the rows of holes are replaced by vertical open gaps to increase the water discharge. FIG. 5 merely shows a relatively wide gap 12 from the upper edge of the rudder to its lower edge. However, as is the case with the holes in FIG. 2, the number of the gaps 12 and their widths are selected according to the rudder shape and size.

The drag and lift forces acting on a rudder are illustrated in FIG. 6.

To the lift and drag coefficients $C_L$ and $C_D$, respectively, the following relation applies:

$$C_L = L/(0.5\pi \cdot V^2 \cdot s)$$

and $$C_D = D/(0.5\pi \cdot V^2 \cdot s),$$

respectively, wherein
L = Lift
D = drag
$\pi = 1000$ kp/m$^3$
V = speed (m/s)
s = movable rudder area (m$^2$)

As will appear from the above and is shown in FIG. 4, the rudder according to the invention acts in such a manner that the water flow through the rudder at zero deflection will be symmetrical, i.e. the water outflow on both sides of the rudder will be the same and have a favourable effect on the separation and the turbulence and cause a corresponding reduction of the resistance. At all rudder angles, from zero and upwards, it has been found that the tendency to rudder vibrations is eliminated, and furthermore it has been found that the rudder action at rudder deflection is essentially improved.

The results of comparison model tests made with a hollow rudder according to the invention and a conventional rudder having the same profile (NACA 0015) with respect to "drag" and "lift" (see FIG. 6 and the above relation) will now be accounted for.

Both rudders, including the tail piece, had a profile according to NACA 0015. In the above description and in the following, the rudder according to the invention is called a "modified NACA 0015 rudder", while the comparison rudder is called an "unmodified NACA 0015 rudder". Both rudders had been surface-treated in the same manner and were tested with the same tail piece and rudderstock. The rudderstock was permanently connected to the tail piece. The tests were conducted at the Institute of Ship Hydromechanics at Chalmers University of Technology, in the small basin of the Institute which has a length of 25 m, a width of 1.8 m, and a depth of 1 m. Travelling across the basin is a carriage with means for the exact fixation and connection of the test object. Provided in conjunction with the basin is a control room in which the towing speed is read and the forces are recorded by recording instruments.

For the rudder tests, the rudderstock was fixed to the carriage in such a manner that the rudder was located in the middle of the basin and such that the distance between the upper edge of the rudder and the water surface was the same as the distance between the lower edge of the rudder and the bottom (0.15 m).

Transducers for measuring drag and lift were applied to the rudderstock. The towing speed was read with an accuracy of 0.01 m/s. Drag and lift were read on the recorder with an accuracy of 5 N.

The two rudder models "modified NACA 0015 rudder" (the hollow rudder according to the invention) and the "unmodified NACA 0015 rudder" were each tested in six test runs.

FIGS. 7 and 8 illustrate the drag in kp as a function of the speed in m/s for the rudder angle 0°, 5°, 10°, 20°, 30° and 35°.

The comparison shows that the drag for the modified NACA 0015 rudder according to the invention (FIG. 7), at all rudder angles tested, is higher than for the comparison rudder (FIG. 8).

The corresponding lift values are accounted for in FIGS. 9 and 10 where FIG. 9 shows the modified NACA 0015 rudder according to the invention and FIG. 10 shows the comparison rudder (the unmodified NACA 0015 rudder). At all rudder deflection angles tested, the lift values are higher for the rudder according to the invention than for the comparison rudder.

The diagram shown in FIG. 11 compares the effect of the Reynolds' number on the lift and drag coefficients at $\alpha = 10°$. The full lines show the drag, and the broken lines show the lift.

As will appear, the rudder according to the invention gives a far better lift at the same drag than the unmodified NACA 0015 rudder. This is confirmed by FIG. 12 which shows a non-dimensional comparison between the rudder according to the invention and the unmodified NACA 0015 rudder at a speed of E = 1.45 m/s.

It should be noted that the essential improvements accounted for above the afforded by the present invention in relation to a conventional rudder having the same profile, were obtained before optimal flow gaps and holes could be established.

An important feature of the invention is the central wall 6 dividing the gap-shaped hollow space, which is open at the leading edge of the rudder, into two juxtaposed spaced apart gaps with outlets at the trailing edge of the rudder. Otherwise, several modifications are possible, such as the arrangement of the outlets at the trailing edge of the rudder, considering that the holes 9 or the gaps (slots) 12 in the side walls 3a, 3b offer essential advantages in respect of the desired modification of the flow and the pressure distribution.

Rudders and keels generally are symmetrical in relation to a vertical central plane and the flow passages then preferably are symmetrically arranged on either side of the central partition 6. Aircraft wings, on the other hand, and also trim flaps generally have opposite sides which are non-symmetrical relative to one another, and in that case it is conceivable or even necessary to dispose the flow passages on one and the other side of a partition non-symmetrically in relation to one another, and it may also be advantageous to provide the passages with closable flaps or the like, for instance at the inlets.

I claim:

1. A hollow water-flow modifying element for boats and ships, said element having leading and trailing ends and a rear end proximate said trailing end, said element comprising a pair of opposite side walls defining a space therebetween and having a pair of opposite, outer surfaces which are symmetrical in relation to each other and in relation to water flow when said boat or ship is moving forward on a straight course and with said element positioned such that said surfaces form substantially similar angles in relation to said course;

wherein one of said outer surfaces forms a suction side and the other a pressure side of said element when said element is positioned at an angle in relation to said course;

a central partition wall means for dividing said space into a pair of parallel, symmetrical flow passages extending in the direction of water-flow from the leading end to the trailing end of said element;

water inflow openings in said element at the leading end of said element in communication with each of said flow passages on either side of said partition;

water outflow openings arranged in each of said side walls in the rear end portion thereof;

wherein any water flow induced by movement of said element in water and passing through said flow passages is symmetrically distributed through the outflow openings of said side walls when said element is moving forward on said straight course;

wherein such water flow will be distributed predominantly through the outflow openings at said suction side of said element to modify water flow therealong when said element is set at an angle in relation to said straight course; and wherein said outflow openings are provided in vertical and horizontal rows in said side walls.

2. An element as claimed in claim 1, wherein each of said side walls, downstream of at least each of a plurality of said outflow openings, has an inwardly directed flow-catching wall portion.

3. An element as claimed in claim 1, wherein said outflow openings in said side walls are in the form of slots which extend with their longitudinal axes at right angles to the direction of flow.

4. An element as claimed in claim 1, wherein said central partition wall means extends from the leading end of said element to the trailing end of said element.

5. An element as claimed in claim 1, wherein said flow passages comprise, on either side of the central partition wall means, a plurality of parallel flow passages separated by transverse wall members.

* * * * *